Sept. 14, 1926.  1,599,761
S. B. GUNN
AUTOMOBILE JACK
Filed Dec. 12, 1921   2 Sheets-Sheet 1
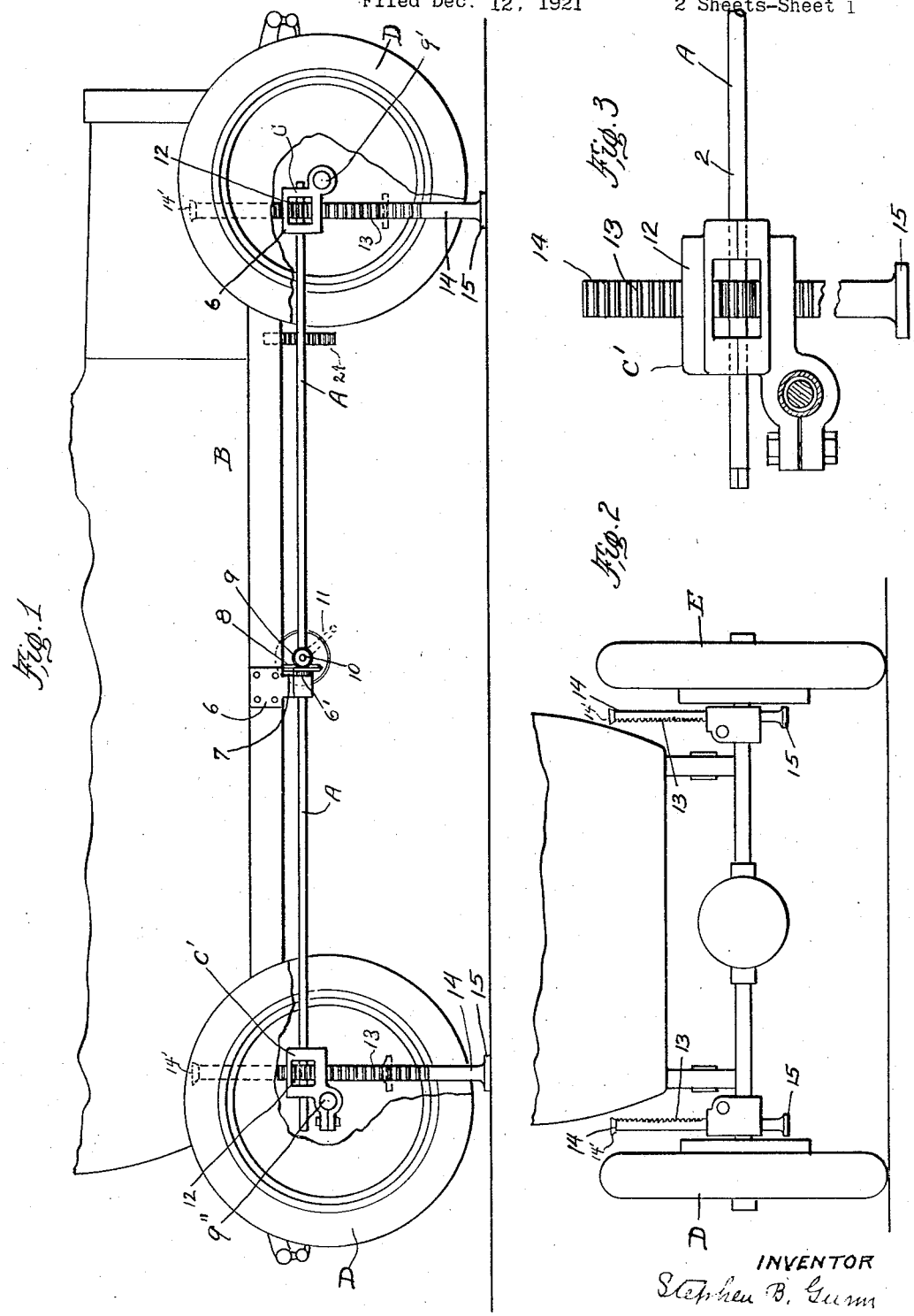

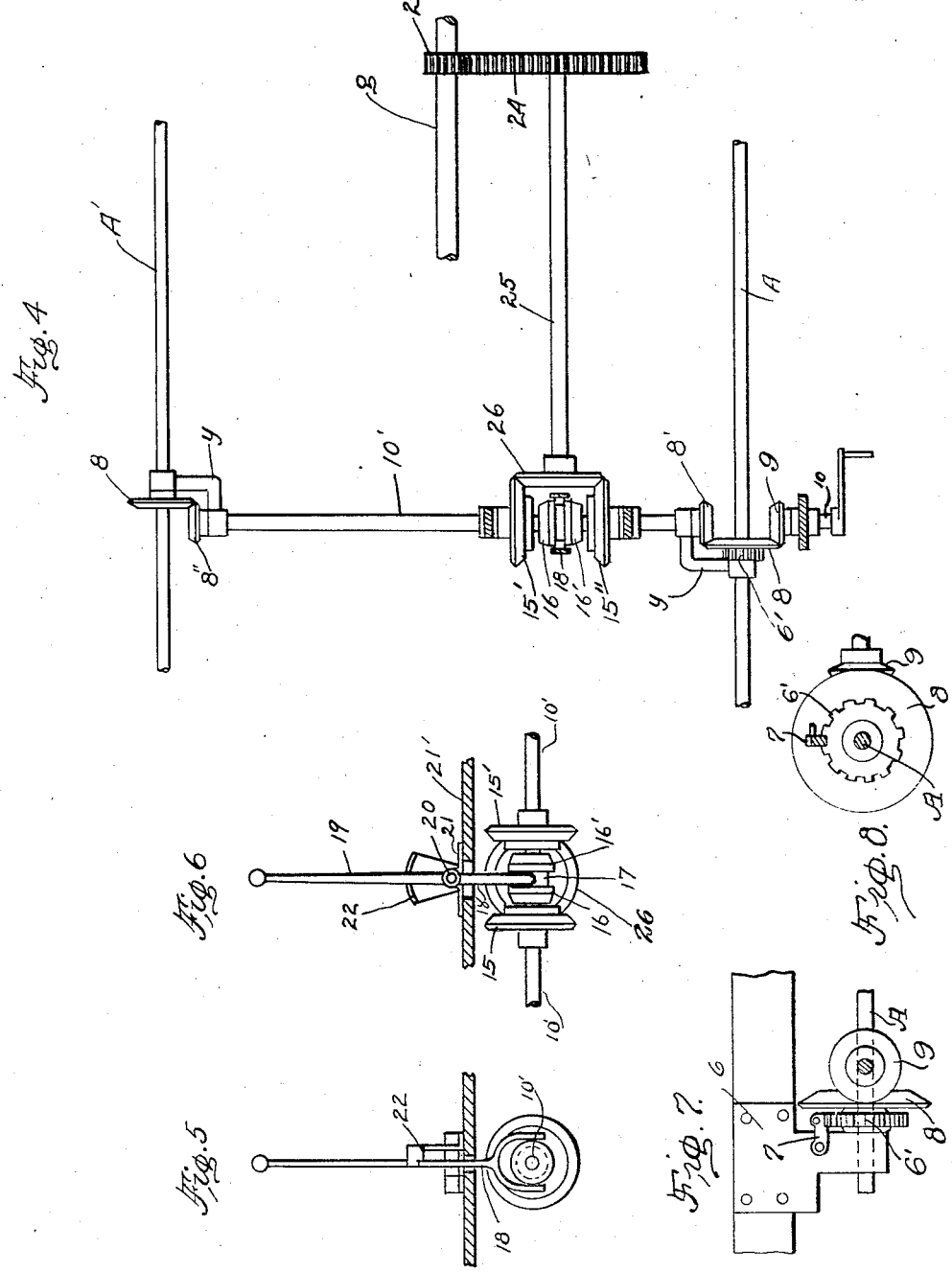

Patented Sept. 14, 1926.

1,599,761

UNITED STATES PATENT OFFICE.

STEPHEN B. GUNN, OF BINGHAMTON, NEW YORK.

AUTOMOBILE JACK.

Application filed December 12, 1921. Serial No. 521,887.

My invention relates to automobile jacks for lifting and lowering automobiles and the wheels of same, either a part or all of the same, and it has for its object to provide a strong, simple device, easily constructed and operated, and easily applied to different styles of cars, its general purpose being a device for readily and easily lifting the wheels of an automobile from the ground for the purpose of removing tires, or mounting tires upon the same, or for jacking up the car for storage purposes when the car is not in use.

With these objects in view my invention consists in certain novel features of construction and arrangement of parts, as will more clearly hereinafter appear and be pointed out in the claim, reference being had to the accompanying drawings, in which—

Fig. 1 is a side view of one form of my device, as applied to a car.

Fig. 2 is an end view of my device as applied to a car.

Fig. 3 is a side view in detail of a part of my device.

Fig. 4 is a plan view of a modified form of a part of my device.

Fig. 5 is a side elevation of a part of my device in cross section.

Fig. 6 is a front elevation of a part of my device in a modified form.

Figures 7 and 8 are detailed views showing the pawl and ratchet mechanism used with my invention.

The same reference characters denote like parts in each of the several figures of the drawing.

In carrying out my invention I provide the extended radius shafts A, one of which shafts may be mounted on either side of the automobile frame B, and which is mounted in a shaft support 6, which support is bolted or mounted in any convenient manner on the side of the automobile frame B, the shaft being rotatably mounted in said support.

Mounted on said shaft A, I have the cog ratchet wheel 6' and pawl 7; also mounted on shaft A I have the bevelled gear 8, which meshes into gear 9, on the crank shaft 10, and into which I connect, or mount removably, crank handle 11.

Mounted in any convenient manner or by means of a divided mounting, or two part support, around the rear axle 9", I have the clamp support C'; and mounted on the front axle 9', I have the clamp support C. In these axle clamp supports C and C', I have pivotally mounted the shaft A and mounted on the shaft A, and within the openings in the side of clamp supports C and C', I have the gears 12, 12, which mesh into the teeth lines 13, 13, respectively, on the inner surface of the jack members 14, 14, which at their lower end, project into the foot formations 15, 15, and have mounted upon the upper end the removable caps 14', 14'. The ratchet wheel 6' and pawl 7, permit the raising of jack members, or lowering of same, and the raising of the car to any fixed position and holding same in said position at any given point. It is to be understood that a similar shaft and gearing are mounted on each side of the car frame, to be used in this form of my device.

In the operation of my device, when I desire to raise the wheels or body of the car for any purpose, I apply crank handle 11, in this form of my device, and turn the gear 9, meshing into gear 8, which turns shaft A, operating gear 12, which connects with the teeth 13 on the member 14, and by this movement I lower the jack feet 15, 15 until they contact with the surface of the ground, and by a continued turning of crank 11, cause the body of the car and the wheels to move upward, and the wheels D, D, on one side of the car, are lifted clear of the ground, as shaft A is turned, and ratchet wheel 6' is engaged by the pawl 7, which, when the movement ceases, at any given point, holds shaft A and gear 12 in a stationary position at any given point from the ground. It is to be understood that the pawls 7 are swingably mounted on the front face of the supports 6 so that they may be moved manually into or out of engagement with the teeth of the corresponding ratchet wheels 6', as desired.

When I desire to lower the car or the wheels D, D, I release pawl 7 from ratchet wheel 6', reversing the movement of crank 11; shaft A turns again in reverse movement; the jack shafts 14, 14 move upward bringing the body of the car and the wheels downward, until they contact with the ground, while the shafts may be raised up to any given distance. In like manner, by turning the crank 11, as applied to the gearing on the opposite side of the car frame, the wheels E, E may be raised by the same operation from the ground and held in that fixed position, or lowered, as before described.

When I desire to raise both sets of wheels from the ground by means of the crank handle, I apply the lowering movement to the jack shafts 14, 14, on both sides of the car body, as before described, and in this manner both sets of wheels and the body of the car can be raised to any given distance from the ground, and remain in that position for an indefinite period, and for storage purposes.

In a further modified form of my device I have the shaft A and a handle crank shaft 10 mounted on or supported from the car frame B, in any convenient manner. On A I have the bevelled gear 8; mounted in the frame B of the car in any convenient manner, by proper shaft supports $y, y$, I have the cross shaft 10', which is an extension in line with crank shaft 10, and mounted on one end of which I have the bevelled cone gear 8', which meshes in with gear 8, and on the opposite end I have the bevelled gear 8", which meshes in with the opposite gear 8. Mounted between gears 8' and 8" and on shaft 10' are arranged idler gears 15' and 15". Keyed on the shaft 10' for sliding movement between the idlers 15' and 15" is the sliding clutch which includes the sliding disk 17 on the respective ends of which are the clutch members 16 and 16'. Arranged about the disk 17 between the clutch members 16 and 16' is the forked lower end of a shift bar 18, the upper end of which terminates in a handle formation 19, and turns on pivot 20, mounted in support 21, fastened in any convenient manner to the floor 21' of the car body. This shift bar 19 is adapted to work back and forth on a guide or segment support 22, in any convenient manner.

Mounted on the crank shaft $g$ of the engine is a cog wheel 23 which meshes with the gear 24 mounted in turn on a longitudinally disposed and rotatably mounted shaft 25 in the car frame B. A bevel gear 26 is mounted on the opposite end of the shaft 25 and normally meshes with both idler gears 15' and 15" and by this arrangement it is apparent that during rotation of the engine shaft the shaft 25 will be rotated to continuously rotate both idlers. When the handle 19 is moved in one direction to shift the sliding clutch so that the member 16 will be arranged in contact with the idler 15' inasmuch as the clutch member is keyed to the shaft 10' this shaft will rotate in the direction of rotation of the idler 15' and by reason of the intermeshing gears between the ends of the shaft 10' and the shafts A, A' respectively these latter shafts will be rotated to in consequence effect operation of the jack members 14 and move the car. A reverse rotation and operation of the parts is effected when the sliding clutch is moved so that the member 16' thereof meshes with the idler gear 15".

It is believed in view of the foregoing that a further detailed description of the operation of the invention is entirely unnecessary. Likewise it is believed that the advantages of the invention will be readily apparent.

Having thus described my invention, what I claim as new and for which I desire Letters Patent is as follows:

The combination with a motor vehicle, of bearings detachably connected to the axle of the same, unbroken shafts arranged at the opposite sides of the vehicle and having their ends rotatable in said bearings, pinions fixed to the opposite ends of the shafts and arranged in said bearings, racks vertically slidable in the bearings and engaging said pinions, a gear fixed on each shaft intermediate its ends, manually operated means for actuating one of said gears, a cross shaft arranged between the first mentioned shafts and having gears at its ends meshing with the intermediate gears of the first mentioned shafts, means cooperating with one of said shafts to lock that shaft in adjusted positions, a gear actuated by the power plant of the vehicle, oppositely disposed gears loosely mounted on the cross shaft and meshing with the last mentioned gear, and a clutch element slidable on the cross shaft and cooperating with said opposed gears for keying either of the opposed gears to the cross shaft.

In testimony whereof I have affixed my signature.

STEPHEN B. GUNN.